United States Patent [19]

Shamshoum et al.

[11] Patent Number: 5,308,818
[45] Date of Patent: May 3, 1994

[54] CATALYST SYSTEM FOR THE POLYMERIZATION OF OLEFINS

[75] Inventors: Edwar S. Shamshoum, Houston; David J. Rauscher, Webster, both of Tex.

[73] Assignee: Fina Technology, Inc., Dallas, Tex.

[21] Appl. No.: 895,534

[22] Filed: Jun. 8, 1992

[51] Int. Cl.$^5$ .............................. C08F 4/656
[52] U.S. Cl. ................... 502/127; 502/125; 502/108; 526/124
[58] Field of Search ............... 502/125, 127, 108

[56] References Cited

U.S. PATENT DOCUMENTS

| | | | |
|---|---|---|---|
| 3,135,809 | 6/1964 | Bosmajian | 502/103 X |
| 4,816,433 | 3/1989 | Terano | 502/125 X |
| 4,829,038 | 5/1989 | Hoppin et al. | 502/125 |
| 4,927,797 | 5/1990 | Ewen | 502/125 X |
| 4,970,186 | 11/1990 | Terano et al. | 502/125 |
| 5,130,284 | 7/1992 | Terano et al. | 502/125 |
| 5,153,158 | 10/1992 | Kioka | 502/125 X |

FOREIGN PATENT DOCUMENTS

| | | |
|---|---|---|
| 0250229 | 12/1987 | European Pat. Off. |
| 0350170 | 1/1990 | European Pat. Off. |
| 0445302 | 9/1991 | European Pat. Off. |
| 0452916 | 10/1991 | European Pat. Off. |

Primary Examiner—Patrick P. Garvin
Attorney, Agent, or Firm—M. Norwood Cheairs; Jim D. Wheelington

[57] ABSTRACT

The present invention provides a catalyst system that exhibits unprecedented catalyst efficiencies and control of desired properties in the polymer product. The catalyst system includes a new generation titanium catalyst in combination with an electron donor described by the formula:

$$R_1 - \underset{\underset{OR_3}{|}}{\overset{\overset{OR_2}{|}}{Si}} - R_4$$

wherein $R_1$ is an alkyl or cycloalkyl group containing a primary or secondary carbon atom attached to the silicon atom; $R_2$ and $R_3$ are alkyl or aryl groups; and $R_4$ is an alkyl or cycloalkyl group with a primary or secondary carbon atom attached to the silicon atom. The system has a catalyst efficiency of over 30 kg/g-cat.h as the Si/Ti mole ratio varies from 4-20 in the system. The system easily achieves efficiencies over 30 kg/g-cat.h. The system also exhibits good control over the xylene solubles of the polymer products.

18 Claims, No Drawings

CATALYST SYSTEM FOR THE POLYMERIZATION OF OLEFINS

BACKGROUND

1. Technical Field

The present invention provides a catalyst system for the polymerization of olefins that include the combination of a titanium catalyst with an electron donor compound of the formula:

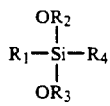

wherein $R_1$ is an alkyl or cycloalkyl group containing a secondary carbon atom attached to the silicon atom; $R_2$ and $R_3$ are alkyl or aryl groups; and $R_4$ is an alkyl or cycloalkyl group with a secondary carbon atom attached to the silicon atom, $R_1$ and $R_4$ can be the same or different.

2. Description of Prior Art

Catalyst systems for the polymerization of olefins are well known in the art. Typically, these systems include a Ziegler-Natta type polymerization catalyst; a co-catalyst, usually an organoaluminum compound; and an electron donor compound. Examples of such catalyst systems are shown in the following U.S. Pat. Nos.: 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalyst and catalyst systems designed primarily for the polymerization of propylene and ethylene.

A Ziegler-Natta type polymerization catalyst is basically a complex derived from a halide of a transition metal, for example, titanium, chromium or vanadium with a metal hydride and/or a metal alkyl that is typically an organoaluminum compound. The catalyst is usually comprised of a titanium halide supported on a magnesium compound complexed with an alkylaluminum.

The development of these polymerization catalysts has proceeded seemingly in generations of catalysts. The catalyst disclosed in the patents referenced above are considered by most to be third generation catalysts. With each new generation of catalysts, the catalyst properties have improved. Particularly, the efficiencies of the catalysts, as expressed in kilograms of polymer product per gram of catalyst in two hours, have increased from the 1-3 range to the 10-12 range and beyond. Catalysts have been developed that not only have higher efficiencies but also retain their activity over a longer period of time, thus being able to produce more polymer product over the life of the catalyst. Any increase in the efficiency and life of the catalyst leads to lower costs due to lower catalyst consumption, and it also lowers the capital expenditures in building and operating a plant as the size of the reactors are lowered for specific plant capacities and the reactor residence time is lowered. A higher efficiency also leads to a cleaner polymer product thereby avoiding the need to wash or treat the product to remove catalyst ash residuals.

In addition to the improved catalysts, improved activation methods have also lead to increases in the catalyst efficiency. A most recent discovery includes a process for pre-polymerizing the catalyst just prior to introducing the catalyst into the reaction zone. This process is disclosed in U.S. Pat. No. 4,767,735 the disclosure of which is hereby incorporated by reference.

In addition to the development of new catalysts and new reaction processes, a discovery of a more appropriate co-catalyst or electron donor to go with the new generation of catalysts in forming a total catalyst system would be of great benefit to the polymerization art especially if it lead to dramatic increases in the efficiency of the catalyst system and to improved quality control of the polymer product. In such a total catalyst system, a co-catalyst activates the catalyst and provides the initiation of a polymer chain.

The co-catalyst that works well with the new generation catalysts is an organoaluminum compound, most typically triethylaluminum (TEAl) or another trialkylaluminum, such as triisobutylaluminum. Examples of other useful organoaluminum compounds include an alkylaluminum dihalide, trialkoxyaluminum and a dialkylaluminum halide.

An electron donor compound is used in the polymerization reaction to reduce the atactic form of the polymer thereby giving control of and increasing the production of isotactic polymers. Although a broad range of compounds are known generally as electron donors, a particular catalyst may have a specific compound or group of compounds with which it is especially compatible. Discovery of an appropriate type of electron donor which gives significant increases in catalyst efficiency as well as improved control of the isotactic index of the desired polymer product and other properties of the product would be highly advantageous. One such group of electron donors are disclosed in U.S. Pat. No. 4,927,797.

The present invention comprises another such discovery. It has been surprisingly discovered that a specific group of silane compounds serving as electron donors in combination with a particular type of catalyst results in significant increases in catalyst efficiency over the previously known efficiencies for this particular type of catalyst as well as other known catalyst systems.

SUMMARY OF THE INVENTION

The present invention provides a system for the polymerization of olefins wherein the system includes the combination of a particular type of catalyst with a specific group of electron donor compounds which results in significant increases in the efficiency of the catalyst and improved control of the properties of the polymer product. The catalyst is a new generation catalyst comprising a complex of a dialkoxy magnesium and a titanium halide. The novel electron donor is selected from a silane compound of the following formula:

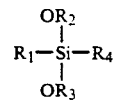

wherein $R_1$ is an alkyl or cycloalkyl group containing secondary carbon atom attached to the silicon; $R_2$ and $R_3$ are alkyl or aryl groups; and $R_4$ is an alkyl or cycloalkyl group with a secondary carbon atoms attached to the silicon atom, $R_1$ and $R_4$ being the same or different. In a preferred embodiment, $R_1$ is a secondary alkyl group of 3 or 5 carbon atoms having mirror image symmetry; $R_2$ and $R_3$ are methyl, ethyl, propyl, or butyl groups and not necessarily the same; and $R_4$ is secondary alkyl or cycloalkyl group of 3–6 carbon atoms having mirror image symmetry; preferred electron donors are diisopropyldimethoxysilane (DIDS); cyclohexylisopropyldimethoxysilane (CIDS) and dicyclopentyldimethoxysilane (CPDS). In addition, the system may contain an organoaluminum compound which acts as a co-catalyst. A preferred co-catalyst is a trialkylaluminum, most preferably triethylaluminum (TEAl).

The invention also provides a catalyst system as described above, wherein the system is capable of polymerizing an olefin monomer with a catalyst efficiency of about 30 kilograms of polymer product per gram of catalyst in one hour. Particular catalyst systems included in the invention may show somewhat lower efficiencies. Further, the catalyst system may be characterized by an efficiency of over 30 kg/g-cat.h while the Si/Ti ratio is defined by the mole ratio of the silane electron donor and the catalyst varies within the range 4–200. Additionally, the catalyst system may be further characterized by an efficiency greater than 30 while producing a polymer product with xylene solubles less than about 2.00%.

The catalyst system may be further characterized by having an isotactic capacity such that the system produces a polymer product in which the xylene soluble atactic form may be kept within the range of 1.24–1.95 wt % of the product while the Si/Ti mole ratio varies up to 200. The system may be further characterized by higher molecular weight of the product.

The invention also provides a process for the polymerization of olefins. The process comprises: contacting the new generation polymerization catalyst with an organoaluminum compound, preferably with a trialkylaluminum; contacting the catalyst with an electron donor either simultaneously with or after contact with the organoaluminum, the electron donor being a silane compound as described by the formula above, prepolymerizing the catalyst by contacting a small amount of monomer with the catalyst; and introducing the catalyst into a polymerization reaction zone containing the organoaluminum compound, the electron donor and the monomer. The process further comprises withdrawing a polymer product in which the xylene solubles are within the range of 1.24–1.95 wt %, while the Si/Ti ratio in the reaction zone is within the range 4–200.

DETAILED DESCRIPTION OF THE INVENTION

The present invention relates to the combination of a particular group of compounds as electron donors with a particular type of catalyst for use in the polymerization of propylene. This combination results in a catalyst system that has a catalyst efficiency significantly higher than provided by previous catalyst systems as illustrated by the comparative examples included below. Further, the catalyst system of the present invention retains most of its high activity over time relative to other catalyst systems. The catalyst system also provides better control of the xylene solubles of the polymer product than with other electron donors and the particular type of catalyst. These and other beneficial advantages will become more apparent from the following detailed description of the invention and the accompanying examples.

Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. A common external electron donor is an organic silicon compound, for example, cyclohexylmethyldimethoxysilane (CMDS). A description of the two types of electron donors is provided in U.S. Pat. No. 4,535,068, the disclosure of which is hereby incorporated by reference.

As the present invention relates particularly to external electron donors, the term "electron donor" as used herein, refers to the external donor. The external electron donor acts as a stereoregulator to control the amount of atactic form of polymer produced. It may also increase the production of isotactic polymers. Organic silicon compounds are known in the art for use as electron donors. Examples of electron donors that are organic silicon compounds are disclosed in U.S. Pat. Nos. 4,218,339; 4,395,360; 4,328,122; 4,473,660 and 4,927,797. As mentioned, a particular catalyst may produce better results when paired with a particular group of electron donors. Examples of this pairing of catalyst and electron donors are disclosed in U.S. Pat. Nos. 4,562,173; 4,547,552; and 4,927,797.

It has been discovered that a particular group of electron donors does significantly enhance the catalytic properties of conventional Ziegler-Natta Catalyst. Any of the conventional Ziegler-Natta transition metal compound catalyst components can be used in the present invention. The compound is preferably of the general formula $MR^+_x$ where M is the metal, R is a halogen or a hydrocarboxyl and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

If supported, the support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The internal electron-donor compounds suitable for preparing conventional Ziegler-Natta catalyst components include ethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethylphenyl and diphenylcarbonate; succinic acid esters, such as mono and diethyl succinate. These esters of phthalic acid are the preferred donors.

One particular Ziegler-Natta catalyst which can be used in the present invention is a new generation, Ziegler-type titanium catalyst for the polymerization of olefins comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii), as disclosed in U.S. Pat. Nos. 4,927,797; 4,816,433 and 4,839,321, the disclosures of which are hereby incorporated.

Preferred aromatic hydrocarbons useful in the formation of the catalyst include benzene, xylene, ethylbenzene, propylbenzene and trimethylbenzene. A diester of phthalic acids is preferably used as the diester of the aromatic dicarboxylic acid. Examples include dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate. Suitable titanium halides include $TiCl_4$, $TiBr_4$ and $TiI_4$, with $TiCl_4$ being preferred.

The ratios of the respective components are not critical but can vary to tailor the performance of the catalyst. However, in generally, the diester of the aromatic dicarboxylic acid is used in an amount of 0.01 to 2 g, preferably 0.1 to 1 g, per gram of the dialkoxy magnesium, and the titanium halide is used in an amount of at least 0.1 g, preferably at least 1 gram, per gram of the alkoxy magnesium. The amount of the aromatic hydrocarbon which is liquid at normal temperature should be sufficient to form a suspension.

Suspension of the dialkoxy magnesium into the aromatic hydrocarbon is performed at a temperature of from room temperature to the boiling point of the aromatic hydrocarbon used for up to 100 hours, preferably up to 10 hours. It is important that the formed suspension should not be a homogeneous solution. The contact of the suspension with the titanium halide and the contact of the composition obtained by said contact with the titanium halide are carried out at a temperature of from −20° C. to the boiling point of the titanium halide used, preferably 50° to 120° C., for 10 minutes to 10 hours. The means for contacting the components is not particularly critical, so far as sufficient contact is attained among the respective components. Preferably, the contact is carried out by using a vessel provided with a stirrer.

The above-described catalyst exhibits some increase in efficiency over previously known catalysts when it is paired with a previously used electron donor, but that increase is significantly greater when the catalyst is paired with electron donors as described by the present invention. This improved efficiency is accompanied by better operational control of the properties of the polymer product such as the xylene solubles.

The electron donors included in the present invention are organic silicon compounds such as those described by the following formula:

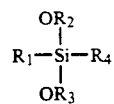

wherein $R_1$ is an alkyl group containing a secondary carbon atom attached to the silicon atom; $R_2$ and $R_3$ are alkyl or aryl groups; and $R_4$ is an alkyl group with a secondary carbon atom attached to the silicon atom; $R_1$ and $R_4$ may be the same or different.

In preferred embodiments of the invention, $R_1$ is a secondary aklyl group of 3 or 5 carbon atoms with mirror image symmetry group, $R_2$ and $R_3$ are methyl, ethyl or propyl groups, and $R_4$ is a secondary cycloalkyl or alkyl group of 1–6 carbon atoms with mirror image symmetry. Most preferred electron donors are diisopropyldimethoxysilane (DIDS), cyclohexylisopropyldimethoxysilane (CIDS) and dicyclopentyldimethoxysilane (CPDS). The combination of DIDS and a conventional Ziegler-Natta catalyst yields wholly unexpected results that surpass previously known catalyst systems. The electron donors as described by the present invention may be limited by the stability of the compound and the ease of handling including storage, transportation and use in the plant.

The most significant unexpected result obtained from the combination of the above-described catalyst and DIDS, CIDS and CPDS is the dramatic increase in the efficiency of the catalyst system as measured in kilograms of polymer product per gram of catalyst in one hour (kg/g-cat.h). The catalyst system, which includes an organo-aluminum compound, has been shown to achieve efficiencies higher than 30 kg/g-cat.h, and the efficiency can be over 30 kg/g-cat.h for Si/Ti mole ratios within the range 4–200. The optimum Si/Ti ratio in order to achieve the highest efficiency is within the range 4–10.

Catalyst systems described by the present invention also exhibit a high efficiency. It is achievable to have catalyst systems that have efficiencies greater than 30 kg/g-cat.h.

Further, the catalyst system is capable of achieving these high efficiencies over a wide range of Si/Ti ratios (4–200) while exhibiting an isotactic capacity in controlling the formation of atactic polymer, or xylene solubles, at relatively low levels. When catalyst desired herein is paired with another donor such as CMDS, the system exhibits an sharp increase in the xylene solubles as the Si/Ti ratio approaches 200. The present catalyst system using DIDS, CIDS or CPDS, however, exhibits a gradual linear increase in the wt % of xylene solubles from about 1.5 to about 2.0% as the Si/Ti ratio decreases from 200 to 4 and below. This gradual linear relationship, as opposed to a sharp increase, has dramatic operational consequences. With a linear relationship, a change in the Si/Ti ratio results in only a small change in the xylene solubles. This allows for small fluctuations in the operation of the reactor, such as when new feed is input or operational errors occur, while still controlling the wt % of xylene solubles in the polymer product within a desired range. It also results in less off-grade material during transition from one grade of product to another. The sharp increase exhibited by the CMDS system, on the other hand, leads to substantial changes in the percentage of xylene solubles with any fluctuation in the Si/Ti mole ratio and the production of considerable off-grade material when switching from one grade to another.

The DIDS, CIDS or CPDS systems also provide higher molecular weight (MW) in the polymer product. An advantage is that a highly active and stable system produces a cleaner polymer as there is more polymer produced for the same amount of catalyst ash and therefore resulting in a lower percentage of ash content in the polymer. The copolymer product would be less corrosive, exhibit less color and be more applicable for use in electrical systems.

The present invention also provides a process for the polymerization of olefins using the catalyst and the electron donors described by the above formula comprising:

a) selecting a conventional Ziegler-Natta catalyst component;
b) contacting the catalyst with an organoaluminum compound;
c) contacting the catalyst with an electron donor as described above;
d) introducing the catalyst into a polymerization reaction zone containing the organoaluminum compound, the electron donor and the monomer; and
e) extracting polymer product from the reactor.

Although the catalyst system may be used in almost any commercially known polymerization process, the preferred process of the present invention includes a prepolymerization of the catalyst by contacting a small amount of monomer with the catalyst after the catalyst has been contacted with the electron donor. A prepolymerization process is described in U.S. Pat. Nos. 4,767,735, and 4,927,797, incorporated by reference above. As provided in those disclosures, a carrier stream for the catalyst is provided, the catalyst is contacted with the co-catalyst or organoaluminum compound, the catalyst is contacted with the electron donor, the catalyst stream is contacted with a relatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A polymer product may then be withdrawn from the reactor. In using the described catalyst with the electron donors described by the formula above, the catalyst may have an efficincy of above 30 kg/g-cat.h while the Si/Ti mole ratio in the reaction is within the range 1-10. The polymer product may also be characterized by xylene solubles within the range 2-10 wt %.

The following Examples and Comparative Examples illustrate the present invention and its various advantages in more detail. The results are summarized in Tables 1-5. The catalyst used was prepared with the materials and processes as disclosed in U.S. Pat. Nos. 4,927,797; 4,816,433 and 4,8639,321.

EXAMPLE 1

Prior to a polymerization run, all traces of moisture and air are expelled from the reactor by heating to a temperature over 100° C. for a minimum of 30 minutes under a constant purge of dry nitrogen. Following this heating, the reactor is cooled to room temperature (25° C.) under nitrogen. The reactor is stabilized at room temperature and then 16 mmoles of hydrogen and 1.0 L of propylene are added. The reactor is stirred at 1000 rpm and the temperature is raised to 70° C. 1.0 mmole of TEAl and 0.1 mmole of donor are added to a 40 cc tubular reaction vessel. Ten milligrams of catalyst in a mineral oil suspension are added to the 40 cc reaction cylinder, The TEAl and donor are allowed to pre-contact approximately five minutes, and the catalyst is allowed to precontact the TEAl and donor mixture for approximately two minutes. The tubular reaction vessel is then attached to an entry point on the reactor and filled with room temperature liquid propylene which is allowed to polymerize for about five seconds to effect prepolymerization of the catalyst. The contents of the vessel are then flushed into the reactor with 0.2 L of room temperature propylene. The total amount of liquid propylene present in the reactor is about 1.2 L. The polymerization reaction is allowed to proceed for one hour, at which point it is terminated by venting the excess propylene and cooling the reactor to room temperature. The reactor is then opened to collect the polymer product which is dried and analyzed. The efficiency of the catalyst was determined from the mass yield of polymer for the known amount of catalyst used. The efficiency is reported in kilograms of polymer product per gram of catalyst per hour. The Si/Ti mole ratio was calculated from the molar amount of DIDS used divided by the molar amount of catalyst. The xylene solubles were measured by dissolving the polymer in hot xylene, cooling the solution to 0° C. and precipitating out the isotactic form. The xylene solubles are the wt % of the polymer that was soluble in the cold xylene. In addition, the bulk density of the polymer product was measured and calculated using standard techniques. The results are shown in Table 1.

EXAMPLES 2-6

The procedures of Example 1 were repeated except that the total amount of DIDS was varied as indicated in Table 1 from 0.02 mmoles to 1.00 mmoles. This varied the Si/Ti ratio from 200 to 4 and illustrates the effect of the Si/Ti ratio on the efficiency and on the xylene solubles. The results are tabulated in Table 1.

As shown in Table 1, the efficiency is greater than 30 kg/g-cat.1 h for Si/Ti ratios within the range from about 4 to about 40 and it decreases as the Si/Ti ratio increases from about 40 to about 200, reaching a maximum at some point between about 4 to about 10 Si/Ti. The DIDS system is capable of easily achieving efficiencies greater than 30 kg/g-cat.1 h. Also, as seen from the results shown in Table 1, the xylene solubles are controlled within a narrow range as the Si/Ti ratio varies from 4-200. The relationship is nearly linear with a small, gradual slope. As discussed, these relationships of the properties of the polymer and the Si/Ti ratio are very advantageous in allowing some fluctuations in the operation of the reactor and/or some errors without significantly changing the properties of the product. It also allows particular specifications for a product to be achieved more easily with a broader range of reactor parameters. The results are shown in Table 1.

EXAMPLES 7-13

The procedures of Example 1 were repeated except cyclohexylisopropyldimethoxysilane (CIDS) was used instead of DIDS. The results are shown in Table 2.

EXAMPLES 14-21

The procedures of Example 1 were repeated except dicyclopentyldimethoxysilane (CPDS) was used instead of DIDS. The results are shown in Table 3.

EXAMPLES 22-27

The procedure of Example 1 were repeated except dicyclohexyl-dimethoxysilane (DCDS) instead of DIDS. The results are shown in Table 4.

COMPARATIVE EXAMPLES 1-4

The procedure of Example 1 were repeated except that CMDS was substituted for DIDS as the electron donor. The results are shown in Table 5.

TABLE 1
DIDS SYSTEM

| Example | TEAl mmol | DIDS mmol | Si/Ti | Catalyst mg | Yield g | Efficiency Kg/g-cat · h | Bulk Density | Xylene Solubles wt % |
|---|---|---|---|---|---|---|---|---|
| 1 | 1 | 0.02 | 4 | 10 | 340 | 34.0 | 0.47 | 1.95 |
| 2 | 1 | 0.05 | 10 | 10 | 336 | 33.6 | 0.49 | 1.64 |
| 3 | 1 | 0.10 | 20 | 10 | 330 | 33.0 | 0.49 | 1.48 |
| 4 | 1 | 0.2 | 40 | 10 | 324 | 32.4 | 0.47 | 1.40 |
| 5 | 1 | 0.50 | 100 | 10 | 247 | 24.7 | 0.47 | 1.50 |
| 6 | 1 | 1.00 | 200 | 10 | 179 | 17.9 | 0.44 | 1.24 |

TABLE 2
CIDS SYSTEM

| Example | TEAl mmol | CIDS mmol | Si/Ti | Catalyst mg | $H_2$ mmol | Yield g | Efficiency Kg/g-cat · h | Bulk Density | Xylene Solubles wt % |
|---|---|---|---|---|---|---|---|---|---|
| 7 | 1 | 0.02 | 4 | 10 | 16 | 289 | 28.9 | 0.47 | 2.16 |
| 8 | 1 | 0.05 | 10 | 10 | 16 | 275 | 27.5 | 0.47 | 3.20 |
| 9 | 1 | 0.10 | 20 | 10 | 16 | 266 | 26.6 | 0.49 | 1.88 |
| 10 | 1 | 0.50 | 100 | 10 | 16 | 232 | 23.2 | 0.48 | 1.56 |
| 11 | 1 | 1.00 | 200 | 10 | 16 | 188 | 18.8 | 0.46 | 1.56 |
| 12 | 1 | 0.05 | 10 | 10 | 8 | 281 | 28.1 | 0.48 | 1.92 |
| 13 | 1 | 0.05 | 10 | 10 | 32 | 348 | 34.8 | 0.48 | 1.80 |

TABLE 3
CPDS SYSTEM

| Example | TEAl mmol | CPDS mmol | Si/Ti | $H_2$ mmol | Catalyst mg | Yield g | Efficiency Kg/g-cat · h | Bulk Density | Xylene Solubles wt % |
|---|---|---|---|---|---|---|---|---|---|
| 14 | 1 | 0.02 | 4 | 16 | 10 | 344 | 34.4 | 0.47 | 2.04 |
| 15 | 1 | 0.05 | 10 | 16 | 10 | 312 | 31.2 | 0.47 | 1.68 |
| 16 | 1 | 1.10 | 20 | 16 | 10 | 293 | 29.3 | 0.47 | 1.20 |
| 17 | 1 | 0.20 | 40 | 16 | 10 | 276 | 27.6 | 0.48 | 1.32 |
| 18 | 1 | 0.50 | 100 | 16 | 10 | 216 | 21.6 | 0.47 | 1.60 |
| 19 | 1 | 1.00 | 200 | 16 | 10 | 144 | 14.4 | 0.45 | 1.92 |
| 20 | 1 | 0.05 | 10 | 8 | 10 | 316 | 31.6 | 0.47 | 1.48 |
| 21 | 1 | 0.05 | 10 | 32 | 10 | 372 | 37.2 | 0.48 | 1.54 |

TABLE 4
DCDS SYSTEM

| Example | TEAl mmol | DCDS mmol | Si/Ti | $H_2$ mmol | Catalyst mg | Yield g | Efficiency Kg/g-cat · h | Bulk Density | Xylene Solubles wt % |
|---|---|---|---|---|---|---|---|---|---|
| 22 | 1 | 0.02 | 4 | 16 | 10 | 280 | 28.0 | 0.44 | 3.68 |
| 23 | 1 | 0.05 | 10 | 16 | 10 | 262 | 26.2 | 0.45 | 3.48 |
| 24 | 1 | 0.10 | 20 | 16 | 10 | 220 | 22.0 | 0.47 | 2.28 |
| 25 | 1 | 0.20 | 40 | 16 | 10 | 202 | 20.2 | 0.48 | 2.12 |
| 26 | 1 | 0.50 | 100 | 16 | 10 | 165 | 16.5 | 0.46 | 2.16 |
| 27 | 1 | 1.00 | 200 | 16 | 10 | 128 | 12.8 | 0.44 | 2.32 |

TABLE 5
CMDS SYSTEM

| Comparative Example | TEAl mmol | CMDS mmol | Si/Ti | Catalyst mg | Yield g | Efficiency Kg/g-cat · h | Bulk Density | Xylene Solubles wt % |
|---|---|---|---|---|---|---|---|---|
| 1 | 1 | 0.10 | 20 | 10 | 298 | 29.8 | 0.49 | 1.84 |
| 2 | 1 | 0.20 | 40 | 10 | 198 | 19.8 | 0.47 | 1.64 |
| 3 | 1 | 0.50 | 100 | 10 | 153 | 15.3 | 0.47 | 1.48 |

TABLE 5-continued

CMDS SYSTEM

| Comparative Example | TEAl mmol | CMDS mmol | Si/Ti | Catalyst mg | Yield g | Efficiency Kg/g-cat · h | Bulk Density | Xylene Solubles wt % |
|---|---|---|---|---|---|---|---|---|
| 4 | 1 | 1.00 | 200 | 10 | 81 | 8.1 | 0.43 | 2.32 |

What is claimed as new and desired to be secured by Letter of Patent of the United States of America is:

1. In a system for the polymerization and copolymerization of olefins, the combination comprising:
   (a) a conventional Ziegler-Natta catalyst component wherein the conventional Ziegler-Natta catalyst component comprises: a solid catalyst component prepared by: (i) suspending a dialkoxy magnesium in an aromatic hydrocarbon that is liquid of normal temperatures, (ii) contacting the dialkoxy magnesium with a titanium halide and further contacting the resulting composition a second time with the titanium halide, and (iii) contacting the dialkoxy magnesium with a diester of an aromatic dicarboxylic acid at some point during the treatment with the titanium halide in (ii); and
   (b) an electron donor described by the formula:

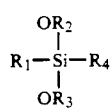

wherein $R_1$ is an alkyl or cycloalkyl group of 3 or 5 carbon atoms having mirror image symmetry containing a secondary carbon atom attached to the silicon atom; $R_2$ and $R_3$ are each independently an alkyl or aryl group; and $R_4$ is an alkyl or cycloalkyl group of 1-6 carbon atoms having mirror image symmetry with a secondary carbon atom attached to the silicon atom, $R_1$ and $R_4$ can be the same or different.

2. The combination of claim 1 wherein $R_1$ is an isopropyl group or cyclopentyl group.

3. The combination of claim 1 wherein $R_2$ and $R_3$ are selected from the group consisting of methyl, ethyl, propyl, and butyl groups.

4. The combination of claim 1 wherein $R_4$ is an isopropyl group, cyclopentyl group or cyclohexyl group.

5. The combination of claim 1 further comprising: (c) an organoaluminum compound.

6. The combination of claim 5 wherein the organoaluminum compound is selected from the group consisting of an trialkyl aluminum, an alkylaluminum dihalide, a trialkoxyaluminum and a dialkylaluminum halide.

7. The combination of claim 6 wherein the organoaluminum compound is triethylaluminum.

8. The combination of claim 1 wherein the electron donor is diisopropyldimethoxysilane, dicyclopentyldimethoxysilane or cyclohexylisopropyldimethoxysilane.

9. The combination of claim 7 wherein the electron donor is diisopropyldimethoxysilane, dicyclopentyldimethoxysilane or cyclohexylisopropyldimethoxysilane.

10. A catalyst system for the polymerization and copolymerization of olefins, said system comprising:
    (a) a conventional Ziegler-Natta catalyst component wherein the conventional Ziegler-Natta catalyst component comprises:
    a solid catalyst component prepared by: (i) suspending a dialkoxy magnesium in an aromatic hydrocarbon that is liquid of normal temperatures, (ii) contacting the dialkoxy magnesium with a titanium halide and further contacting the resulting composition a second time with the titanium halide, and (iii) contacting the dialkoxy magnesium with a diester of an aromatic dicarboxylic acid at some point during the treatment with the titanium halide in (ii); and
    (b) an electron donor described by the formula:

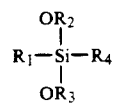

wherein $R_1$ is an alkyl or cycloalkyl group of 3 or 5 carbon atoms having mirror image symmetry containing a secondary carbon atom attached to the silicon atom; $R_2$ and $R_3$ are each independently an alkyl or aryl group; and $R_4$ is an alkyl or cycloalkyl group of 1-6 carbon atoms having mirror image symmetry with a secondary carbon atom attached to the silicon atom; and
    (c) an organoaluminum compound;
said system being characterized by:
    (i) a catalyst efficiency of over 30 kilograms of polymer product per gram of catalyst in one hour as the mole ratio Si/Ti as derived from the Si in compound (b) to the Ti from compound (a) is within the range of 4-200.

11. The system of claim 10 wherein the system is further characterized by:
    (ii) an isotactic capacity such that the system produces a polymer product in which the xylene solubles are controlled within the range of 1.24-1.93 wt % of the polymer product while the Si/Ti mole ratio varies down to 4.

12. The system of claim 10 wherein $R_1$ is an isopropyl group or cyclopentyl group.

13. The system of claim 10 wherein $R_2$ and $R_3$ are selected from the group consisting of methyl, ethyl, propyl, and butyl groups.

14. The system of claim 10 wherein $R_4$ is an isopropyl group, cyclopentyl group or cyclohexyl group.

15. The system of claim 10 wherein the catalyst is prepolymerized.

16. The system of claim 10 wherein the organoaluminum compound is selected from the group consisting of an trialkylaluminum, an alkylaluminum dihalide, a trialkoxyaluminum and a dialkylaluminum halide.

17. The system of claim 10 wherein the electron donor is diisopropyldimethoxysilane, dicyclopentyldimethoxysilane or cyclohexylisopropyldimethoxysilane.

18. The system of claim 10 wherein the organoaluminum compound is triethylaluminum.

* * * * *